United States Patent
Hlubina et al.

(10) Patent No.: US 9,738,147 B2
(45) Date of Patent: Aug. 22, 2017

(54) MOTOR VEHICLE CHASSIS COMPRISING TWO REINFORCED SIDE MEMBERS

(71) Applicant: RENAULT s.a.s., Boulogne Billancourt (FR)

(72) Inventors: Thierry Hlubina, Chaville (FR); Olivier Rioult, Voisins le Bretonneux (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 0 days.

(21) Appl. No.: 15/113,707

(22) PCT Filed: Jan. 15, 2015

(86) PCT No.: PCT/FR2015/050095
§ 371 (c)(1),
(2) Date: Jul. 22, 2016

(87) PCT Pub. No.: WO2015/110742
PCT Pub. Date: Jul. 30, 2015

(65) Prior Publication Data
US 2017/0001509 A1    Jan. 5, 2017

(30) Foreign Application Priority Data
Jan. 24, 2014  (FR) ..................................... 14 50617

(51) Int. Cl.
*B60K 5/12*    (2006.01)
*B62D 21/02*   (2006.01)
*B62D 25/08*   (2006.01)

(52) U.S. Cl.
CPC ............... *B60K 5/12* (2013.01); *B62D 21/02* (2013.01); *B62D 25/082* (2013.01)

(58) Field of Classification Search
CPC ......... B60K 5/12; B62D 25/082; B62D 21/02
See application file for complete search history.

(56) References Cited

U.S. PATENT DOCUMENTS 5,466,033 A * 11/1995 Murakami ............. B62D 21/09
                                                      296/187.09
6,213,243 B1 * 4/2001 Studebaker ............ B60K 15/01
                                                      180/314

(Continued)

FOREIGN PATENT DOCUMENTS

EP     1 690 722 A2   8/2006
JP     4-43172 A      2/1992

OTHER PUBLICATIONS

International Search Report issued Apr. 23, 2015, in PCT/FR2015/050095 Filed Jan. 15, 2015.

(Continued)

*Primary Examiner* — Darlene P Condra
(74) *Attorney, Agent, or Firm* — Oblon, McClelland, Maier & Neustadt, L.L.P.

(57) ABSTRACT

A motor vehicle chassis comprises two side members that are at least partially hollow and have an approximately rectangular cross-section, and two identical reinforcement parts each capable of engaging with a side member to support a power train in an engine compartment of the motor vehicle. Each reinforcement part comprises a substantially parallelepipedic stamped metal sheet open on one face. Each reinforcement part is disposed entirely inside one of the side members and comprises two orifices in a first face and two orifices in a second face, which is separate from and orthogonal to the first face. The four orifices are tapped so as to define four identical nuts.

7 Claims, 2 Drawing Sheets

(56) References Cited

U.S. PATENT DOCUMENTS

| | | | |
|---|---|---|---|
| 6,270,066 B1 * | 8/2001 | Pasek | F16F 1/3814 |
| | | | 180/299 |
| 6,390,437 B1 | 5/2002 | Hong | |
| 6,997,276 B2 * | 2/2006 | Yoshida | B60G 99/00 |
| | | | 180/232 |
| 8,657,070 B2 * | 2/2014 | O'Brien | E06C 7/165 |
| | | | 182/120 |
| 2010/0127128 A1 * | 5/2010 | Giavarini | B60R 16/0215 |
| | | | 244/131 |

OTHER PUBLICATIONS

French Search Report Issued Sep. 16, 2014, in FR 14 50617 Filed Jan. 24, 2014.

* cited by examiner

MOTOR VEHICLE CHASSIS COMPRISING TWO REINFORCED SIDE MEMBERS

BACKGROUND OF THE INVENTION

The invention relates to a motor vehicle chassis comprising a reinforcement part for fixing the power train of an electrically driven or combustion-powered motor vehicle, and to a vehicle comprising a chassis of this type.

A motor vehicle generally comprises a chassis assembled so as to define the passenger compartment of the vehicle, and an engine compartment separate from the passenger compartment. The engine compartment can be situated at the front or at the rear of the vehicle and is intended to receive the power train of the motor vehicle.

Whether electric or combustion-based, the power train is generally suspended between two side members of the chassis of the motor vehicle by means of power train supports.

In addition to their function of holding the power train in a fixed position, the supports of the power train must be formed so as to allow a damping of the vibrations of this power train such that these vibrations do not propagate through the chassis.

The battery of an electrically driven motor vehicle is generally mounted beneath a front part of the floor of the motor vehicle. It is therefore not positioned between the same side members as the fuel tank of the corresponding combustion-powered vehicle, the fuel tank being generally beneath a rear portion of the floor of the motor vehicle. Consequently, in the electric version of the motor vehicle, an empty space is left by the absence of the tank. In spite of this space, the energy transmitted in the event of various impacts must be absorbed without any risk of deformation so as to comply with the criteria relating to the integrity of the structure of the passenger compartment and of the fuel tank, whilst maintaining the functionalities of the fixing of the rear suspension of the vehicle as well as the possibility of opening the rear doors.

Generally, the supports of the power train, which are also referred to as engine interfaces, are formed by arranging a raiser part between the side members and the engine. This raiser part is formed from a multi-part assembly which is offset above the side member. This offset assembly has the effect of reducing the rigidity at the receiving point at the interface. The raiser part is thus reinforced as a result.

Given the configuration necessary to receive the power train on a raiser part, each raiser part must be shaped differently depending on whether it is intended to be fixed on the left side member or on the right side member of the chassis.

Each support then receives the power train to be fixed via a support part which also comprises specific geometric features depending on the type of power train and the side of the chassis on which it is installed.

The object of the invention is to overcome the aforementioned disadvantages by providing a chassis comprising two common supports, that is to say which can be used whatever the power train, and which are also identical, that is to say can each be used both on the right side member and on the left side member.

SUMMARY OF THE INVENTION

In accordance with one aspect of the invention, a motor vehicle chassis is proposed which comprises two side members that are at least partially hollow and have an approximately rectangular cross-section, and two identical reinforcement parts each capable of engaging with a side member to support a power train in an engine compartment of the motor vehicle, each reinforcement part comprising a substantially parallelepipedic stamped metal sheet open on one face and disposed entirely inside one of the side members, each reinforcement part also comprising two orifices in a first face and two orifices in a second face, which is separate from and orthogonal to the first face, the four orifices being tapped so as to define four identical nuts.

The integration of the reinforcement part inside the side member makes it possible to reinforce the inside of the side member so as to allow for the forces of the power train toward the substructure of the chassis of the vehicle. The reinforcement part and the hollow interior of the side member in which the reinforcement part is housed make it possible for the entire body of the side member to be subjected to stress.

The integration also makes it possible to provide a reinforcement part that can be used on each of the two side members without adaptation. It also makes it possible to use the reinforcement part whatever the type of power train (electric or combustion-based) used by the motor vehicle provided with this chassis.

Each reinforcement part is advantageously made in one piece so as to reduce the assembly steps and thus increase the strength of the part.

The reduction of the number of parts in order to provide a reinforcement part also makes it possible to reduce the reference number in the technical documentation and the number of parts to be handled, which results in a simplification of the production of the chassis.

The stamped metal sheet of each reinforcement part preferably comprises tabs folded one on top of the other and welded by welding points.

The provision of four identical nuts in the reinforcement part for the fixing of the support part intended to receive the power train makes it possible to standardize the screwing operations during assembly of the power train.

Each reinforcement part advantageously comprises recesses formed on at least one of its outer faces and able to define ribs on the corresponding inner faces so as to stiffen the part and facilitate the anticorrosion treatment.

The ribs formed in the reinforcement part can be formed during the stamping of the metal sheet from which the reinforcement part is made. The ribs are formed both so as to stiffen the reinforcement part and so as to facilitate the anticorrosion treatment of the reinforcement part.

Each reinforcement part is fixed by welding points to the inside of the side member so as to connect the reinforcement part to the side member.

The chassis comprises two support parts for the power train able to fix the power train to each of the side members with the aid of the reinforcement parts.

The support parts are specific to the type of power train used, so as to perfectly adjust the fit with which the power train is received on the side member.

In accordance with another aspect of the invention, a motor vehicle comprising a power train and a chassis as defined above is proposed.

BRIEF DESCRIPTION OF SEVERAL VIEWS OF THE DRAWINGS

Further advantages and features of the invention will become clear upon examination of the detailed description of a non-limiting embodiment of the invention and of the accompanying drawings, in which.

DETAILED DESCRIPTION OF INVENTION

Figure 1:
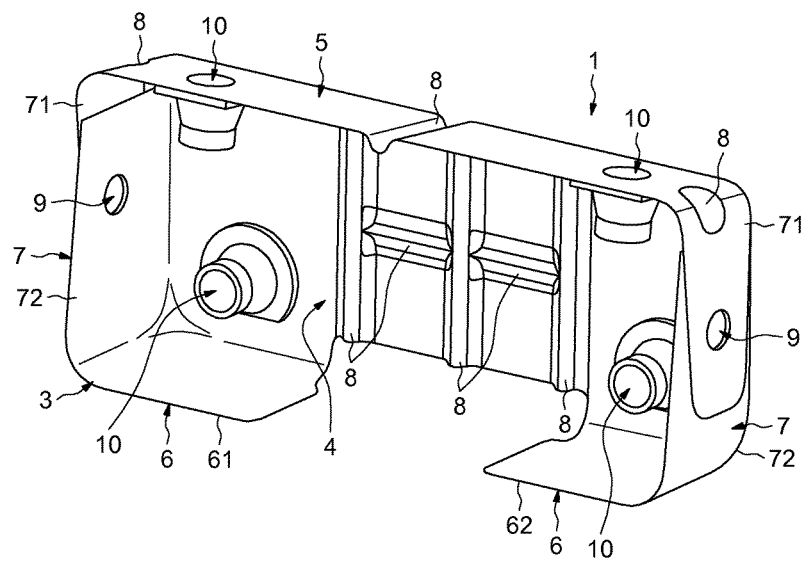
FIG. 1 schematically shows a side member reinforcement part of a chassis in accordance with one embodiment.

FIG. 1 schematically shows a reinforcement part 1 for a side member 2 of a chassis of a motor vehicle in accordance with one embodiment.

The reinforcement part 1 forms a rectangular parallelepipedic casing which is open on one face 3. The reinforcement part 1 is formed from a metal sheet panel. The metal sheet panel is stamped so as to form a box open on the face 3. Once stamped, the reinforcement part 1 has a main face 4 opposite the open face 3. The reinforcement part 1 also has an upper face 5 opposite a lower face 6 formed from two portions 61 and 62 spaced apart from one another, the upper face 5 and the lower face 6 extending between the main face 4 and the open face 3. The reinforcement part 1 also comprises two side faces 7 extending on the one hand between the main face 4 and the open face 3 and on the other hand between the upper face 5 and the lower face 6.

Each side face 7 comprises two side face portions 71 and 72 folded one on top of the other so as to form a continuous side face 7. The first portion 71 of each side face 7 is connected to the upper face 5 of the reinforcement part 1. The second portion 72 of each side face 7 is connected to the lower face 6 of the reinforcement part 1. The second portion 72 of a side face 7 is connected to a portion 61 of the lower face 6 and the second portion 72 of the other side face 7 is connected to the other portion 62 of the lower face 6. The formation of the lower face 6 in two parts 61 and spaced apart from one another makes it possible to limit the surfaces in contact with the side member.

Each of the two portions 71 and 72 of the side faces 7 is stamped so as to allow a folding of the panel between the upper face 5 and the first portion 71 of each side face 7 on the one hand and a folding of the panel between the second portion 72 of each side face 7, the main face 4 and the lower face 6 on the other hand.

The first portion 71 of each side face 7 is folded so as to fold over the second portion 72 of the corresponding side face 7. The two portions 71 and 72 of each side face 7 are connected with the aid of a welding point, for example.

The main face 4 comprises grooves formed on its outer part so as to form ribs 8 on the inner part of the main face 4, that is to say on the part opposite the open face 3. The ribs 8 make it possible, on the one hand, to reinforce the structure of the reinforcement part 1 and, on the other hand, to facilitate the passage of the cataphoretic paint during the anticorrosion treatment of the reinforcement part 1.

The ribs 8 formed in the reinforcement part 1 are formed during the stamping of the metal sheet from which the reinforcement part 1 is made. The ribs 8 disposed vertically, that is to say extending between the upper face 5 and the lower face 6, all open out at the interval between the two lower face portions 61 and 62. These ribs contribute to the rigidity of the reinforcement part 1 and also make it possible to reduce the contact surface with the side member.

The upper face 5 also comprises, on its inner part, a rib 8 formed so as to communicate with a rib of the main face 4.

Two ribs 8 are also formed so as to extend, respectively, between the upper face 5 and the first portion 71 of each of the two side faces 7.

Each side face 7 comprises an orifice 9 allowing a flow of air in the side member 2.

The main face 4 also comprises two identical tapped orifices 10. The two orifices are formed on either side of the set of vertical ribs 8 of the main face 4. The orifices 10 are provided in such a way as to form two identical nuts.

The upper face 5 also comprises two identical tapped orifices 10. The two orifices 10 are identical to the orifices 10 of the main face 4 so as to themselves form two nuts identical to each other, these being identical to the two nuts of the main face 4.

Figure 2:
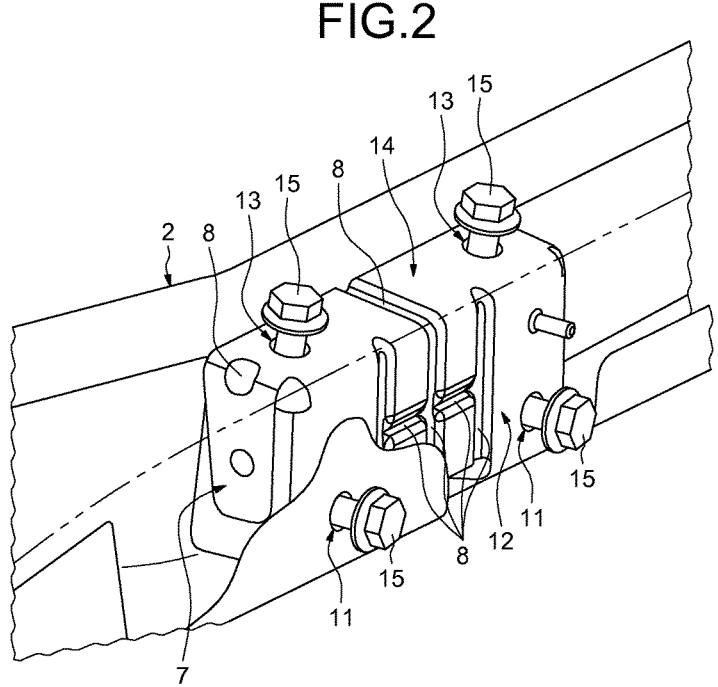
FIG. 2 illustrates a detail of a side member of the chassis provided with the reinforcement part of FIG. 1.

FIG. 2 illustrates an exploded view of a side member 2 of the chassis provided with the reinforcement part 1 of FIG. 1.

The reinforcement part 1 is inserted in a hollow portion of the side member 2. The side member 2 has a rectangular parallelepipedic general shape. The side member 2 comprises four orifices able to receive screws 15. Two orifices 11 are formed in a first face 12 of the side member 2 so as to be opposite orifices 10 in the main face 4 of the reinforcement part 1. Two other orifices 13 are formed in a second face 14 of the side member 2 so as to be opposite orifices 10 in the upper face 5 of the reinforcement part 1 when the reinforcement part 1 is housed in the side member 2.

Figure 3:
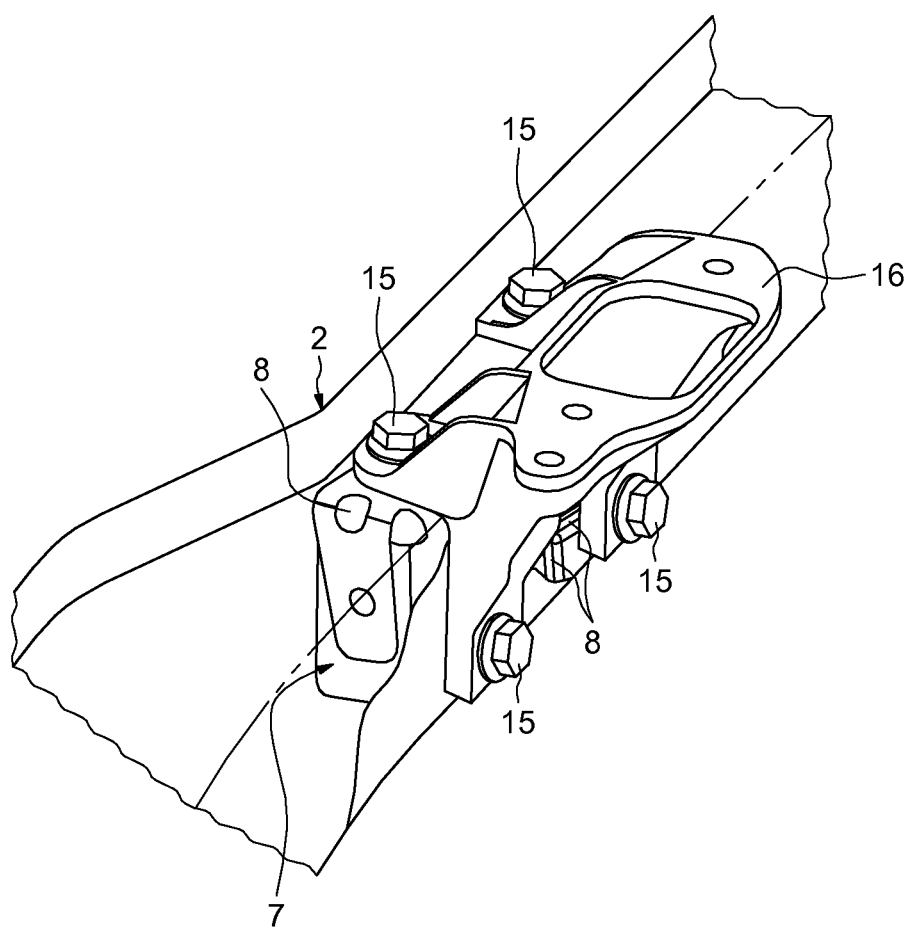
FIG. 3 illustrates a detail of a side member of the chassis provided with the reinforcement part of FIG. 1 and a support part of the power train.

As is illustrated in FIG. 3, which shows an exploded view of a side member 2 of the chassis of a motor vehicle provided with the reinforcement part 1 of FIG. 1, the screws 15 make it possible to fix to the side member 2 a support part 16 for the power train.

The shaping of the support part 16 is specific depending on the type of power train, that is to say depending on whether the motor vehicle is propelled or pulled by a heat engine or an electric motor. The support part 16 makes it possible to suspend the power train between two side members disposed on each side of the chassis of the motor vehicle and defining an engine compartment at the place where the power train is located.

The reinforcement part 1 thus makes it possible to reinforce the side member at the location where the support part 16 is fixed. In addition, the provision of the reinforcement part 1 means it can be used regardless of the type of power train used. In addition, the reinforcement part used in the left side member and that used in the right side member are the same, which means that only the support part 16 needs to be modified depending on the type of power train and the side of the chassis on which the support part is fixed.

The invention thus provides a chassis comprising two common supports, that is to say supports which can be used regardless of the power train and which are identical, that is to say can each be used both on the right side member and also on the left side member.

The invention claimed is:

1. A motor vehicle chassis comprising two side members that are at least partially hollow and have an approximately rectangular cross-section, and two identical reinforcement parts each capable of engaging with a side member to support a power train in an engine compartment of the motor vehicle, characterized in that each reinforcement part comprises a substantially parallelepipedic stamped metal sheet open on one face, each reinforcement part being disposed entirely inside one of the side members, each reinforcement part comprising two orifices in a first face and two orifices in a second face, which is separate from and orthogonal to the first face, the four orifices being tapped so as to define four identical nuts.

2. The chassis as claimed in claim 1, in which each reinforcement part is made in one piece.

3. The chassis as claimed in claim 1, in which the stamped metal sheet of each reinforcement part comprises tabs folded one on top of the other and welded by welding points.

4. The chassis as claimed in claim 1, in which each reinforcement part comprises grooves formed on at least one of its outer faces and able to define ribs on the corresponding inner faces.

5. The chassis as claimed in claim 1, in which each reinforcement part is fixed by welding points to the inside of the side member.

6. The chassis as claimed in claim 1, comprising two support parts for the power train able to fix the power train to each of the side members with the aid of the reinforcement parts.

7. A motor vehicle comprising a power train, characterized in that it comprises a chassis as claimed in claim 1.

\* \* \* \* \*